United States Patent [19]
Hirayama

[11] Patent Number: 5,903,268
[45] Date of Patent: *May 11, 1999

[54] POSITION CONTROL APPARATUS FOR DISPLAYING A WINDOW'S EFFECTIVE IMAGE AREA

[75] Inventor: Tomoshi Hirayama, Tokyo, Japan

[73] Assignee: Sony Corporation, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 07/831,953

[22] Filed: Feb. 6, 1992

[30] Foreign Application Priority Data

Feb. 9, 1991 [JP] Japan .................................. P3-039286

[51] Int. Cl.$^6$ ........................................................ G06F 3/00
[52] U.S. Cl. ................................................................ 345/342
[58] Field of Search .................................. 395/157, 159; 345/121, 118, 179, 340–345

[56] References Cited

U.S. PATENT DOCUMENTS

| | | | |
|---|---|---|---|
| 4,783,648 | 11/1988 | Homma et al. | 340/724 |
| 4,786,897 | 11/1988 | Takenashi et al. | 345/121 X |
| 4,813,013 | 3/1989 | Dunn | 345/333 |
| 4,899,136 | 2/1990 | Beard et al. | 345/156 |
| 4,939,507 | 7/1990 | Beard et al. | 345/156 |
| 5,060,135 | 10/1991 | Levine et al. | 345/351 |
| 5,063,600 | 11/1991 | Norwood | 382/186 |
| 5,140,677 | 8/1992 | Fleming et al. | 345/348 |
| 5,151,974 | 9/1992 | Tani et al. | 345/428 |
| 5,187,776 | 2/1993 | Yanker | 345/341 |
| 5,191,644 | 3/1993 | Takeda | 345/344 |
| 5,237,653 | 8/1993 | Noguchi et al. | 345/345 |
| 5,268,677 | 12/1993 | Frasier et al. | 345/118 |
| 5,276,437 | 1/1994 | Horvath et al. | 345/340 |
| 5,283,864 | 2/1994 | Knowlton | 345/350 |
| 5,305,435 | 4/1994 | Bronson | 345/351 |

OTHER PUBLICATIONS

Microsoft, Windows 3.0 User Manual, 1990 pp. xi–xvi, 20–22, 46, 157, 494.
Borland, Quattro Pro Users Guide, 1989, pp. 235 to 250.
IBM Technical Disclosure Bulletin, vol. 32, No. 8B, Jan. 1990, p. 311 (New York).

Primary Examiner—Anton Fetting
Attorney, Agent, or Firm—Limbach & Limbach L.L.P.

[57] ABSTRACT

The effective display area of a window, in a window display apparatus, is corrected to prevent it from protruding beyond the visible area of the display. A coordinate data input device selects an icon and moves the icon to the display area to display a window image. Depending upon the location to which the icon is moved, correction of the resulting image may be necessary to ensure that the effective display area is shown. Once a window has been displayed, no correction is performed if the window is subsequently moved.

9 Claims, 17 Drawing Sheets

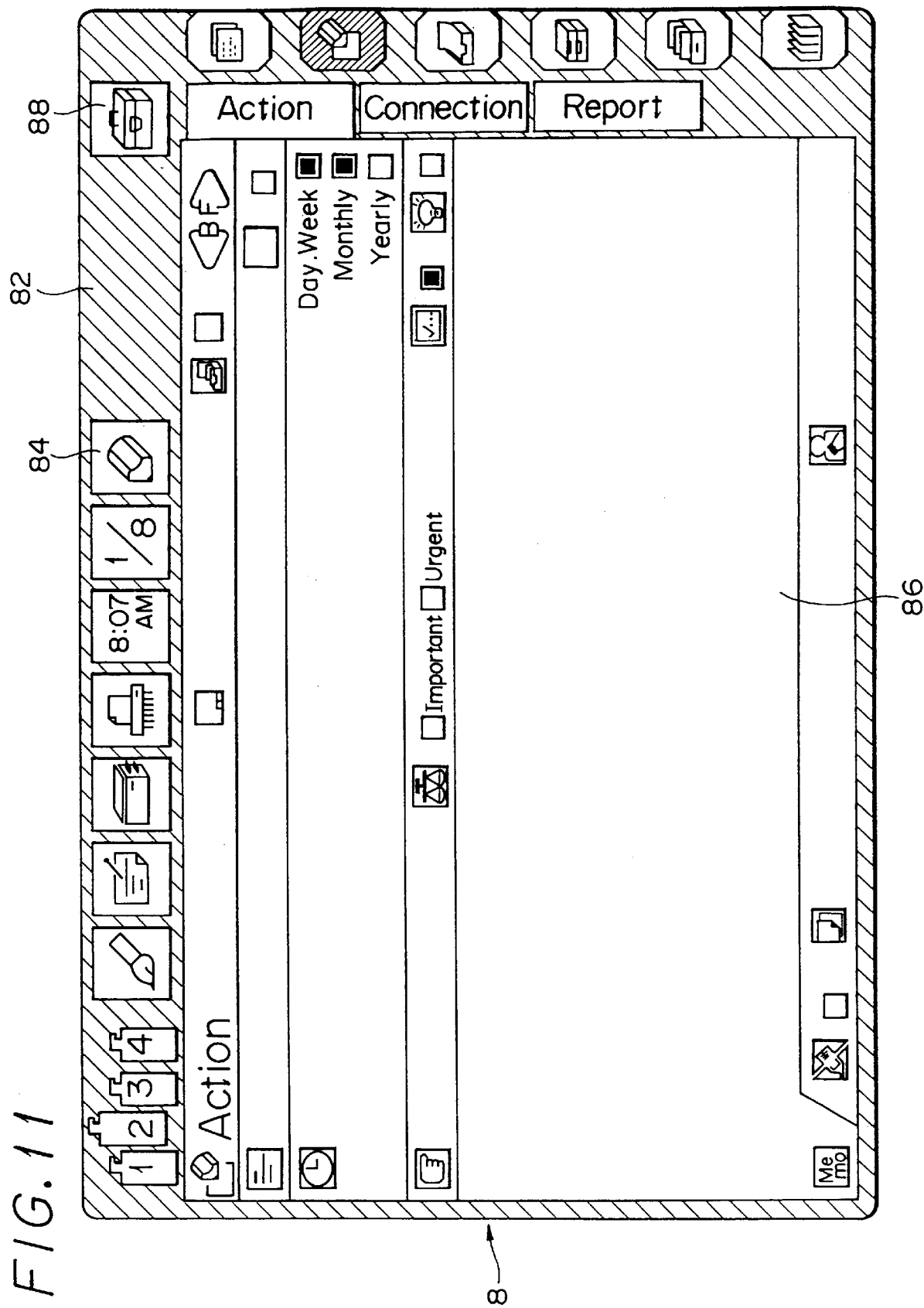

($\beta > 0$)

($\beta < 0$)

POSITION CONTROL APPARATUS FOR DISPLAYING A WINDOW'S EFFECTIVE IMAGE AREA

BACKGROUND OF THE INVENTION

1. Field of the Invention

The present invention generally relates to display apparatus for displaying a window image and, more particularly, is directed to a display apparatus for displaying a window image in which a display position of the window image on a display screen is pointed to by a coordinate data input device.

2. Description of the Prior Art

In a window display apparatus employed in a conventional portable computer, a variety of icons 84 are displayed on an icon area (i.e., standby area) 82 of a display screen 8 as shown in FIG. 1. If the user pushes (pen-down) a predetermined icon 84 (e.g., "printing type" icon 84 on the display screen 8 with a pen (not shown) which is a coordinate data input device, drags the pen up to an input display area (data writing area) 86 under the pen-down state and releases the pen from the display screen 8 (pen-up), then such icon 84 is displayed on the display screen 8 as a window (e.g., printing type plate) 84L in an enlarged scale as shown in FIG. 1.

According to the above-mentioned conventional technique, if the pen-up position is displaced in the lateral direction (in the left and right direction) of the display screen 8, the enlarged icon, i.e., the window 84L is displayed on the display screen 8 under the condition such that a part thereof is omitted as shown by a phantom block in FIG. 2. The reason for this is that the window display apparatus is programmed so as to move the window 84L at its upper center 84c by the penpoint of the pen as shown in FIG. 3. Further, also when the the pen-up position is displaced in the longitudinal direction (upper and lower direction) of the display screen 8, then the window 84L is displayed on the display screen 8 under the condition such that a part thereof is omitted as shown by a phantom block in FIG. 4.

OBJECTS AND SUMMARY OF THE INVENTION

Therefore, it is an object of the present invention to provide an improved display apparatus for displaying a window image in which the aforesaid shortcomings and disadvantages encountered with the prior art can be eliminated.

More specifically, it is an object of the present invention to provide a display apparatus for displaying a window image in which an effective image area of a window can be prevented from protruding from a display screen.

Another object of the present invention is to provide a display apparatus for displaying a window image in which a display window can be allowed to protrude from a display screen within a tolerance range.

According to an aspect of the window display apparatus of the present invention, the display position of the window on the display screen is pointed to by a coordinate input device. This window display device includes a display correcting device so that, if the window protrudes from the display screen when the window is displayed at the position pointed to by the coordinate input device, the window display position is corrected so as to display at least the effective image area within the display screen.

According to another aspect of the window display apparatus of the present invention, the display position of the window on the display screen is pointed to by a coordinate input device. This window display device includes a detecting means for detecting the condition of the window display and a display correcting means for correcting a window display position if a detected result of the detecting means is a first condition and disabled if a detected result is a second condition when the window displayed position pointed by the coordinate input device is outside of the tolerance range of protrusion of the window.

According to the window display apparatus of the first aspect, if the window is protruded from the display screen when the window is displayed at the position pointed by the coordinate input device, the window display position is corrected such that at least the effective display area of the window is wholly displayed within the display screen, thus preventing the effective display area of the window from protruding from the display screen.

In accordance with the window display apparatus of the second aspect, when the position pointed by the coordinate input device is out of the tolerance range of the protrusion of the window, the display position is corrected or not corrected depending on the condition. Therefore, the window display apparatus can be utilized properly.

The preceding and other objects, features, and advantages of the present invention will become apparent from the following detailed description of an illustrative embodiment thereof to be read in conjunction with the accompanying drawings, in which like reference numerals are used to identify the same or similar parts in the several views.

BRIEF DESCRIPTION OF THE DRAWINGS

FIG. 11 is a schematic diagram showing a displayed content on the display screen in the initial state of the portable computer shown in FIGS. 5 through 9;

DETAILED DESCRIPTION OF THE PREFERRED EMBODIMENT

The present invention will now be described with reference to the drawings.

Figure 1:
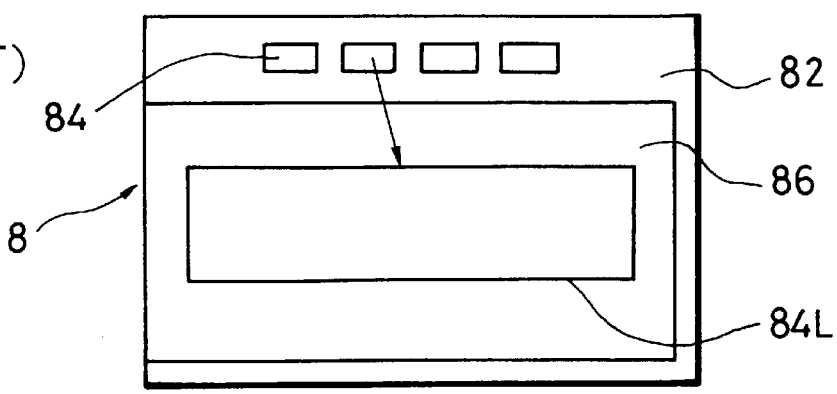
FIG. 1 is a schematic diagram showing a relation between a window and an icon in a conventional display apparatus for displaying a window image.
Figure 2:
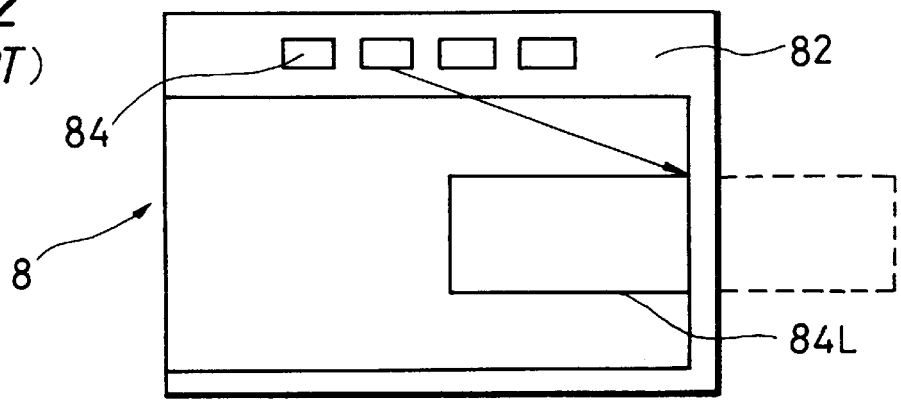
FIG. 2 is a schematic diagram showing a displayed position of a window when a penpoint of an input pen is displaced in the lateral direction (left and right direction) in the conventional display apparatus for display a window image.
Figure 3:
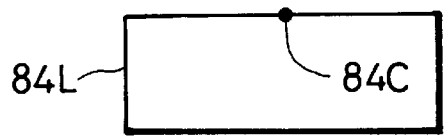
FIG. 3 is a schematic diagram used to explain a structure of a window in the conventional display apparatus for displaying a window image.
Figure 4:
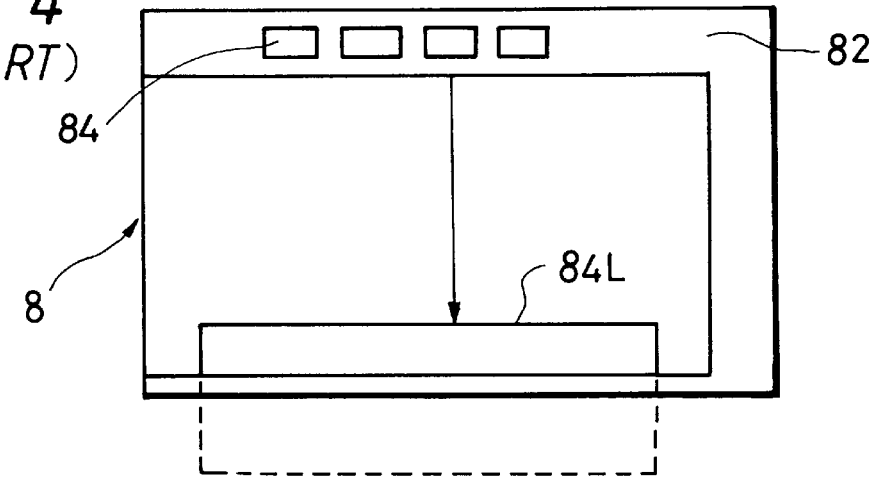
FIG. 4 is a schematic diagram showing a displayed position of the window when the penpoint of the input pen is displaced in the longitudinal direction (upper and lower direction) in the conventional display apparatus for displaying a window image.
Figure 5:
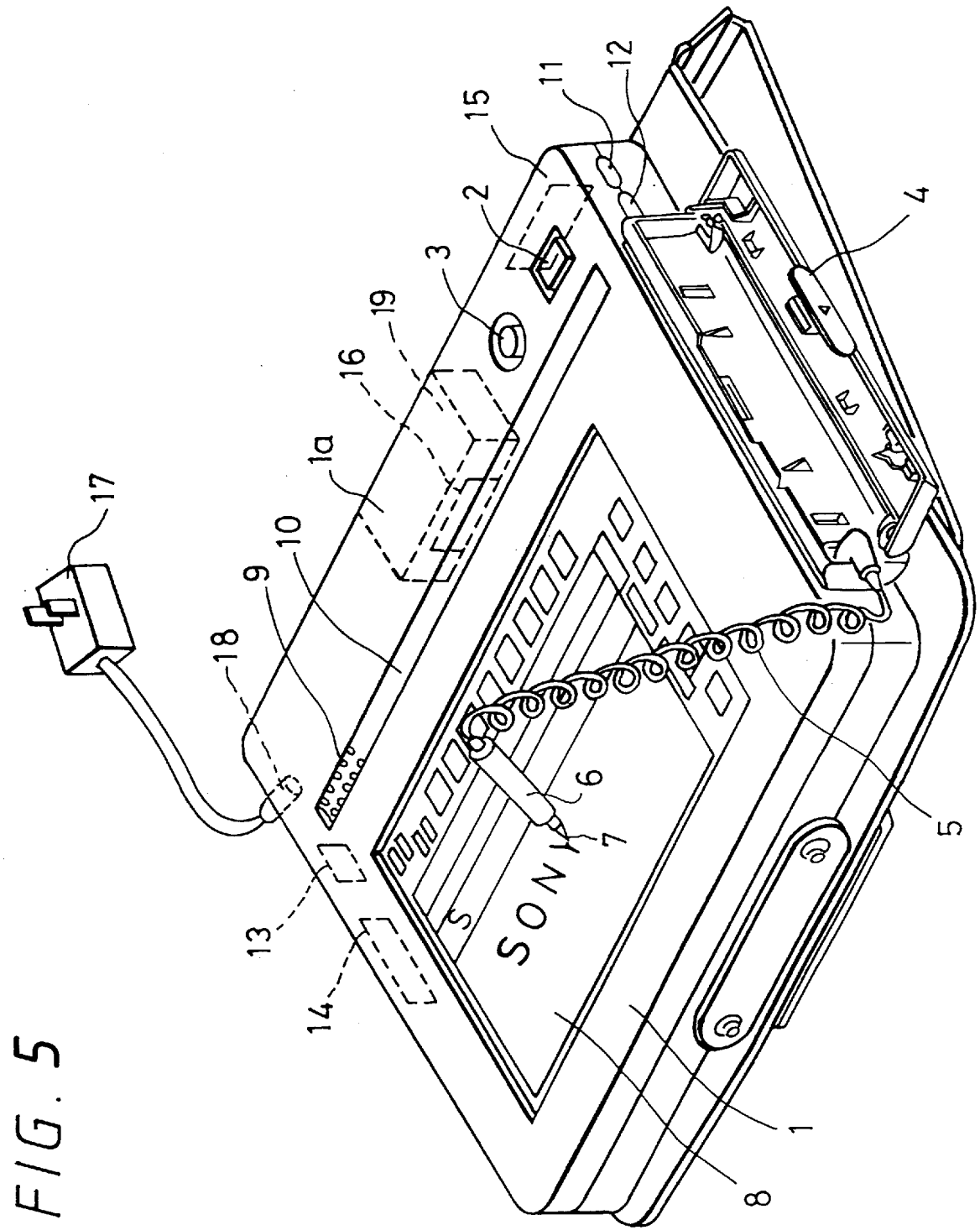
FIG. 5 is a perspective view illustrating an overall arrangement of an embodiment of a portable computer to which a display apparatus for displaying a window image of the present invention is applied.

FIG. 5 is a perspective view showing an arrangement of the embodiment in which the window image display apparatus of the present invention is applied to the portable computer.

As shown in FIG. 5, a computer unit 1 has a power switch 2 which is turned on when this portable computer is in use and which is turned off when the portable computer is not in use. A brightness control switch 3 is provided on the left of the power switch 2 in order to control brightness of a display screen 8 (i.e., brightness of a liquid crystal display (LCD) 22 which will be described later). A case 4 is provided on the side portion of the computer unit 1 and the case 4 houses therein a tablet pen 6 having a switch 7 coupled to the top thereof and which is coupled to the computer unit 1 via a cord 5 when the tablet pen 6 is not in use. The tablet pen 6 can be placed in a slit 10 horizontally formed on the upper portion of the computer unit 1 under the condition such that it is taken out from the case 4. A speaker 9 is disposed at the left side portion of the slit 10 so as to emanate a predetermined sound.

Two switches 11 and 12 are provided on the upper right side of the computer unit 1. The switch 11 is a change-over switch that switches a brightness of a back-light, which will be described later, in two stages, for example. The switch 12 is a volume change-over switch that switches volume of sound generated from the speaker 9 in three stages, for example. A switch 13 is a stop switch provided on the left side portion of the computer unit 1 and operated to stop a predetermined operation (e.g., to disable the speaker 9 which is emanating a sound). An IC socket (slot) 14 is disposed on the left side portion of the computer unit 1 to receive a memory (IC) card 70 (see FIG. 5). A socket 15 is provided at the rear portion of the computer unit 1 and a socket 16 also is disposed in the inside of a battery compartment 1a which is formed on the rear portion of the computer unit 1 so as to house a battery 19. These sockets 15 and 16 are coupled with, for example, RS232C cable, a MODEM (modulator and demodulator), other adapters or the like. Further, a connection terminal 18 for an AC adapter 17 is provided on the upper left portion of the computer unit 1.

Figure 6:
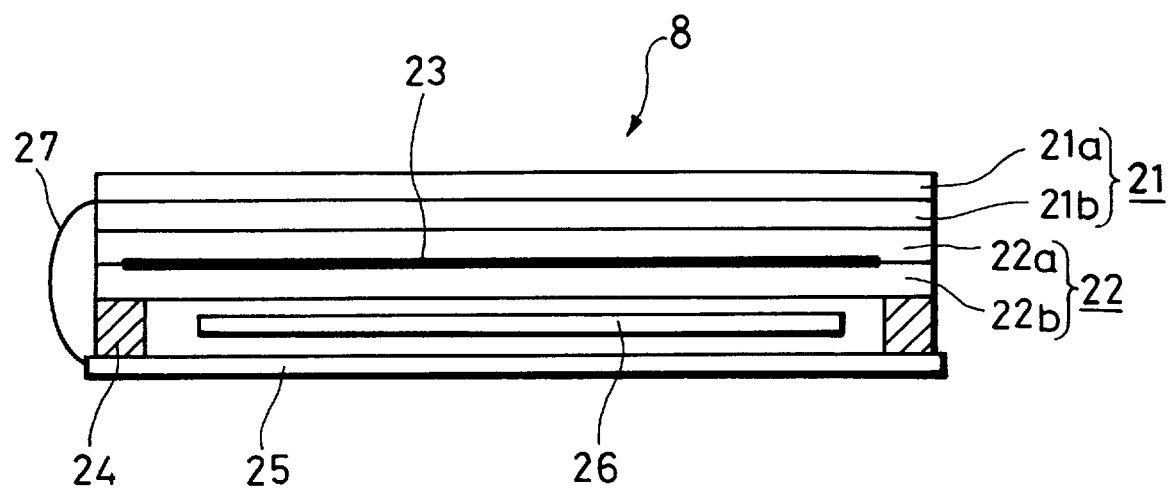
FIG. 6 is a cross-sectional side view illustrating a structure of a display screen used in the portable computer shown in FIG. 5.

An example of the structure of the display screen 8 will be described more fully with reference to FIG. 6 forming a cross-sectional side view. In this embodiment, as shown in FIG. 6, a tablet 21 is provided on the top of the display screen 8 and the tablet 21 is comprised of a tablet 21a which is used to detect the position in the X axis direction and a tablet 21b which is used to detect the position in the Y axis direction. An LCD 22 is provided below the tablet 21 and the LCD 22 is composed of upper and lower glass plates 22a, 22b and a liquid crystal 23 sandwiched between the glass plates 22a and 22b. A fluorescent plate (EL) 26 is provided below the LCD 22. When the fluorescent plate 26 provided as the back-light becomes luminous, a light from the fluorescent plate 26 radiates the LCD 22. The tablets 21a and 21b are formed of a transparent material so that the user can see an image displayed on the liquid crystal 23 from above in FIG. 6. A printed circuit board (PCB) 25 incorporates therein parts (not shown) and electrically coupled to the LCD 22 by means of a rubber connector 24. The printed circuit board 25 also is coupled to the tablet 21 by means of a conductive film 27.

Figure 7:
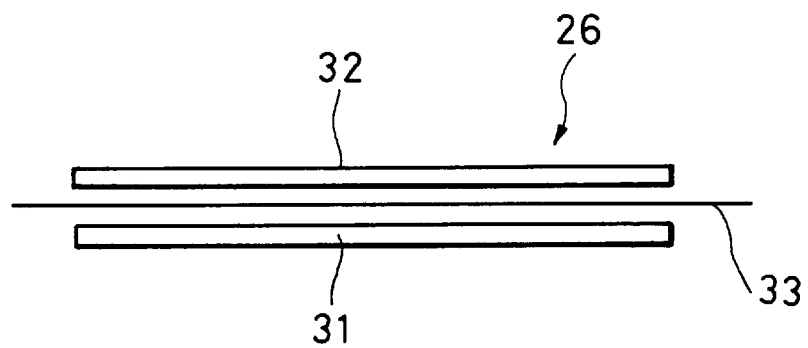
FIG. 7 is a cross-sectional side view illustrating a structure of a fluorescent plate of the display screen shown in FIG. 6.

An example of the structure of the fluorescent plate 26 will be described more in detail with reference to FIG. 7. In this embodiment, as shown in FIG. 7, an insulating film 33 is disposed between an electrode 31 and a light generating unit (i.e., other electrode) 32. The light emitting unit 32 is energized by the application of a predetermined voltage to the spacing between the electrode 31 and the light emitting unit 32. The electrode 31 and the light emitting unit 32 are formed as plates and hence can radiate the display screen 8 uniformly.

The back-light is not limited to the fluorescent lamp 26 and other fluorescent lamps might be used. Further, one such variant is also possible: A fluorescent lamp is provided on the side portion of the computer unit 1 as a side light and a light from the fluorescent lamp is transmitted to the rear portion of the LCD 22 by means of a light transmitting member, thereby radiating the display screen 8.

Figure 8:
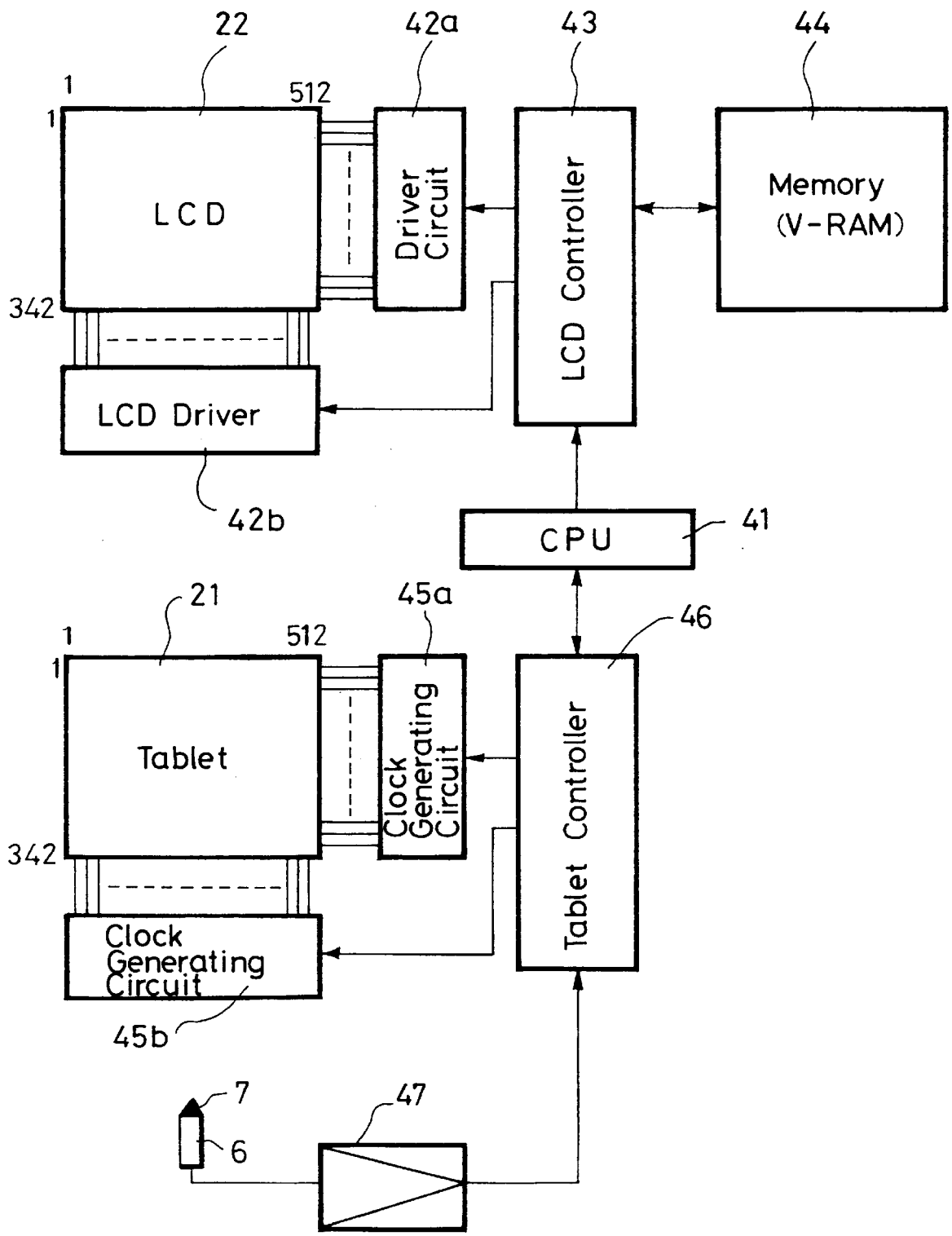
FIG. 8 is a block diagram showing a principle of how to detect a position on a tablet constructing the display screen of the portable computer shown in FIG. 5 and a principle of how to display an image on an LCD.

FIG. 8 is a block diagram showing an electrical connection between the tablet 21 and the LCD 22, and to which references will be made in explaining principle of how to detect the position by the tablet and of how to display an image by the LCD.

Referring to FIG. 8, it will be seen that the tablet 21 includes 512 electrodes in the X axis direction and 342 electrodes in the Y axis direction, for example, thus making it possible to detect 512×342 pixels (picture elements). A tablet controller 46 controls a clock generating circuit 45a to sequentially apply a predetermined voltage to the 342 electrodes one by one. Then, the tablet controller 46 controls a clock generating circuit 45b to sequentially apply a predetermined voltage to the 512 electrodes. More specifically, the tablet 21 is scanned by clocks generated from the clock generating circuits 45a and 45b. When the tablet pen 6 is moved close to a predetermined position on the tablet 21, a predetermined electrostatic capacitance is generated between the tablet 21 and the tablet pen 6. Then, when the tablet pen 6 presses the tablet 21 with pressure, the switch 7 disposed at the top of the pen 6 is turned on to detect an electric charge generated between the pen 6 and a predetermined electrode of the tablet 21 and a detected signal is supplied to the tablet controller 46 via an amplifier 47. Because the tablet controller 46 controls the clock generating timing of the clock generating circuits 45a and 45b, it is possible to detect the position at which the pen 6 presses the tablet 21 by the detected signal supplied from the pen 6 and the clock generating timing. The tablet controller 46 supplies a central processing unit (CPU) 41 with operation coordinate information detected with respect to the pen 6. The CPU 41 constantly monitors the position (pen-down position) at which the switch 7 is turned on by touching the tablet 21 with the pen 6 with pressure and the position (pen-up position) at which the switch 7 is turned off by releasing the pen 6 from the tablet 21. That is, an input information is received by the pen-down operation and the input information is determined by the pen-up operation.

The CPU 41 controls an LCD controller 43 to write data corresponding to an image to be displayed in a memory (V-RAM) 44. The LCD controller 43 reads data out of the memory 44 and supplies a signal corresponding to the data thus read-out to an LCD driver 42b. The LCD 22 includes 512 electrodes in the horizontal direction and 342 electrodes in the vertical direction in association with the tablet 21. An LCD driver 42a sequentially applies a predetermined voltage to the 342 electrodes one by one, while the LCD driver 42b sequentially applies a voltage corresponding to image data to each of the 512 electrodes. Thus, pixels on the LCD 22 are respectively scanned to thereby display a predetermined image on the LCD 22.

The electrical arrangement of the computer unit 1 will be described more fully with reference to FIG. 9.

Figure 9:
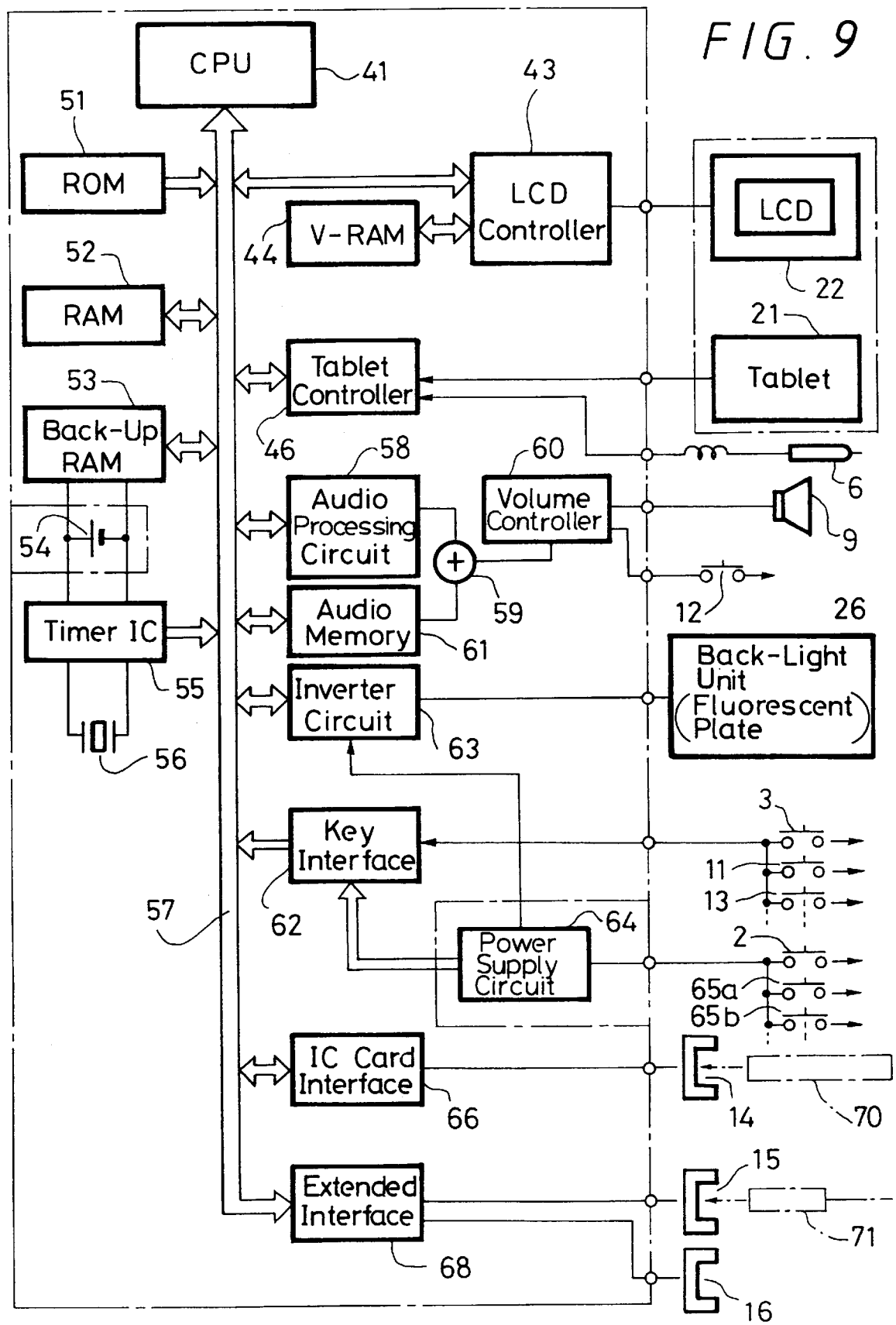
FIG. 9 is a block diagram showing an electrical arrangement of a computer unit of the portable computer shown in FIG. 5.

As shown in FIG. 9, it will be seen that the CPU 41 is coupled to a variety of ICs or the like through a bus line 57. A read only memory (ROM) 51 stores therein, in addition to a system program for the entirety of this portable computer, a Kana-Kanji conversion program for a word processor function in the Japanese language, a dictionary table for such word processor function, a program for recognizing handwritten characters, a dictionary table for such recognition program and window display programs which will be described later with reference to FIGS. 10 and 11. A random access memory (RAM) 52 is a RAM for work area and stores therein data necessary for operation at any time. A back-up battery 54 (battery different from the foregoing battery 19) is connected to a RAM 53 so as to back-up necessary data in the RAM 53 even when the power switch of the computer unit 1 is turned off. A timer IC 55 is connected to the back-up battery 54 and counts a clock from a quartz oscillator 56 to derive data of year, month, day and time of the present timing point. The LCD controller 43 and the tablet controller 46 also are connected to the CPU 41 via the bus line 57.

An audio processor circuit 58 generates a predetermined audio signal in response to input from the sockets 14 through 16 or to an instruction from the CPU 41 and supplies the same to an adder 59. An audio memory 61 is controlled by the CPU 41 to supply a predetermined audio signal (e.g., an alarm sound "What ?") to the adder 59. The adder 59 adds the output signal from the audio processor circuit 58 and the output signal from the audio memory 61 and supplies an added output signal to the speaker 9 via a sound volume controller 60. The volume change-over switch 12 is connected to the volume controller 60 and the volume is controlled by operating the volume change-over switch 12.

The fluorescent plate (back-light unit) 26 is supplied with a power from a power supply circuit 64 (this power supply circuit 64 is supplied with a power from the battery 19 or the AC adapter 17 when the power switch 2 is turned on) through an inverter circuit 63. Brightness of the fluorescent plate 26 can be switched in two stages (e.g., brightness suitable for a bright room and brightness suitable for a dark room) by energizing the change-over switch 11 through the inverter circuit 63. Apart from the switching of the brightness of the fluorescent plate 26, brightness of the LCD 22 can be selected to be a desired value in multiple stages by controlling the brightness control switch 3. A switch 65a is turned on and off in response to the type of the battery 19 loaded on the computer unit 1, that is, whether the battery 19 is a primary battery or a secondary battery. A switch 65b is used to detect a capacity of the battery 19 and is turned on and off in response to the capacity of the battery 19. These switches 65a and 65b or the like are coupled through the power supply circuit 64 to an key interface 62. The key interface 62 is coupled with the brightness control switch 3, the change-over switch 11, the stop switch 13 or the like. The key interface 62 supplies signals corresponding to on/off states of these switches to the CPU 41.

An IC card 70 is coupled to the socket 14 and the CPU 41 can receive and transmit data, program or the like from and to the IC card 70 through an IC card interface 66. Further, an adapter 71 is coupled to the sockets 15 and 16 and coupled to the CPU 41 via an extended interface 68.

Figure 10A:
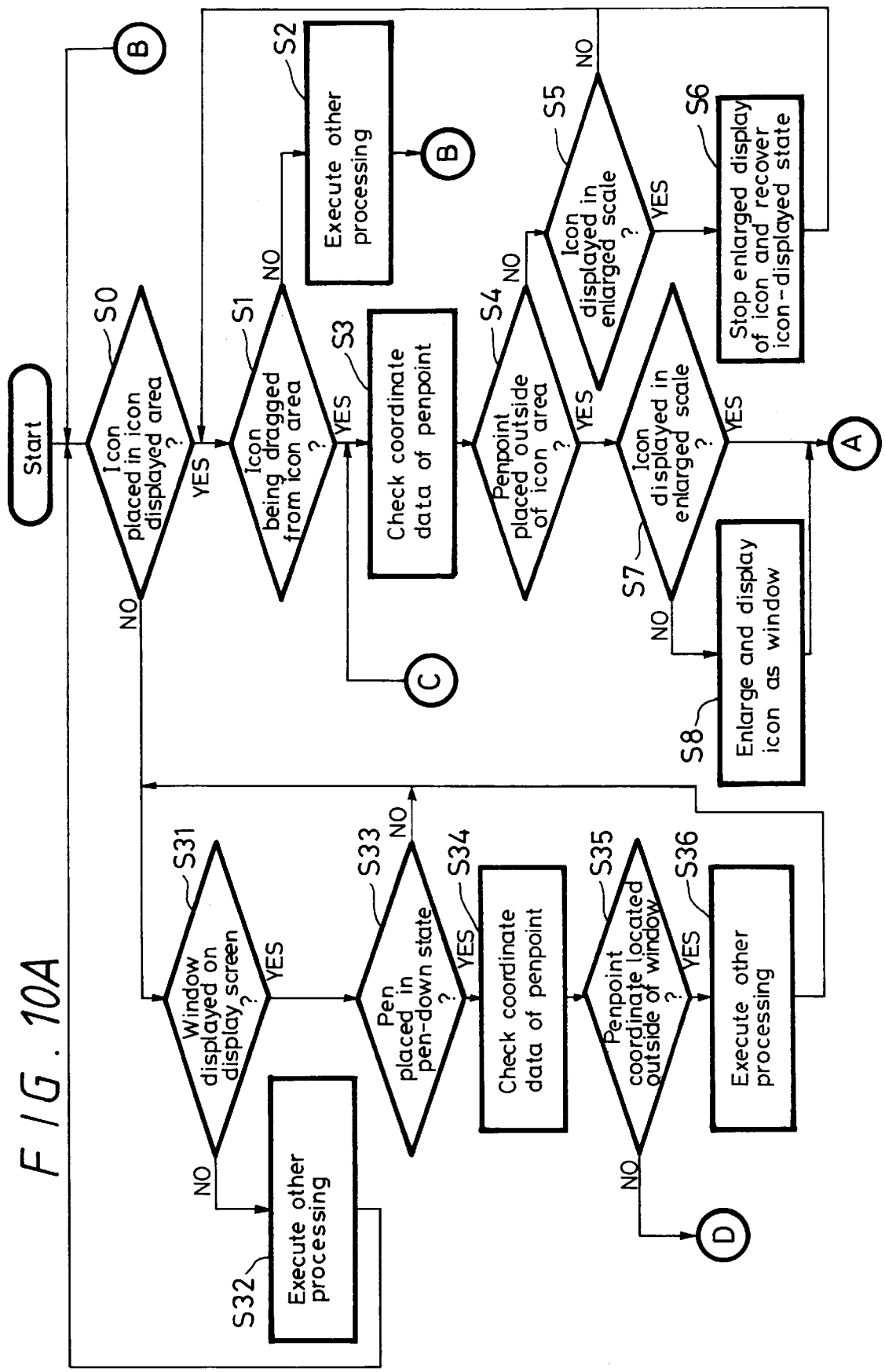
FIG. 10, which is formed of FIGS. 10A and 10B drawn on two sheets of drawings so as to permit the use of a suitably large scale, is a flowchart to which references will be made in explaining one portion of a window display operation of the portable computer shown in FIGS. 5 to 9.
Figure 10B:
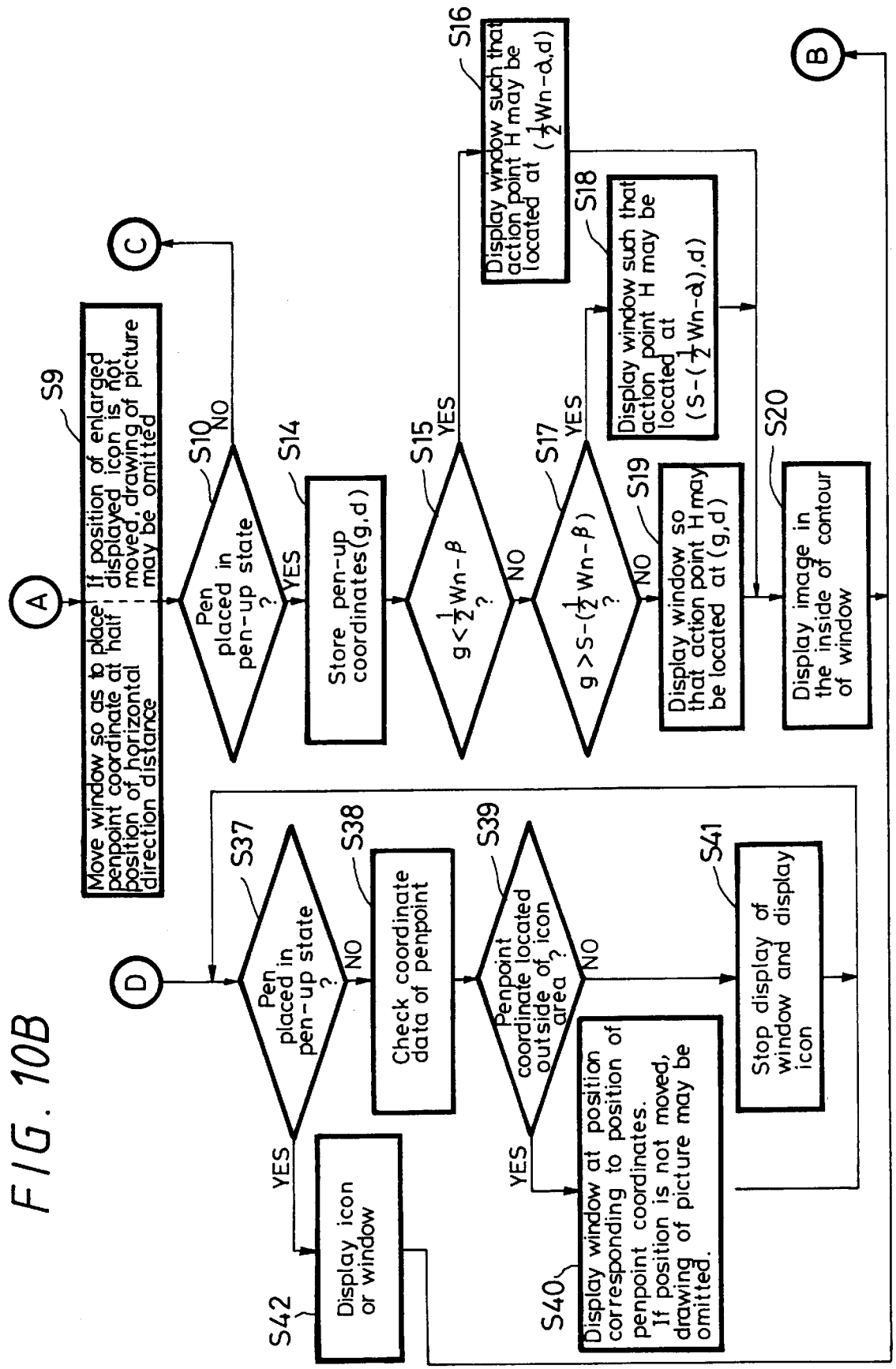

FIG. 10 (formed of FIGS. 10A and 10B) shows a flowchart to which references will be made in explaining operation of the window display apparatus to which the above-mentioned portable computer thus arranged is applied. In the initial state of the portable computer, as shown in FIG. 11, various icons 84 are displayed on an icon area (standby area) 82 of the display screen 8.

Figure 12:
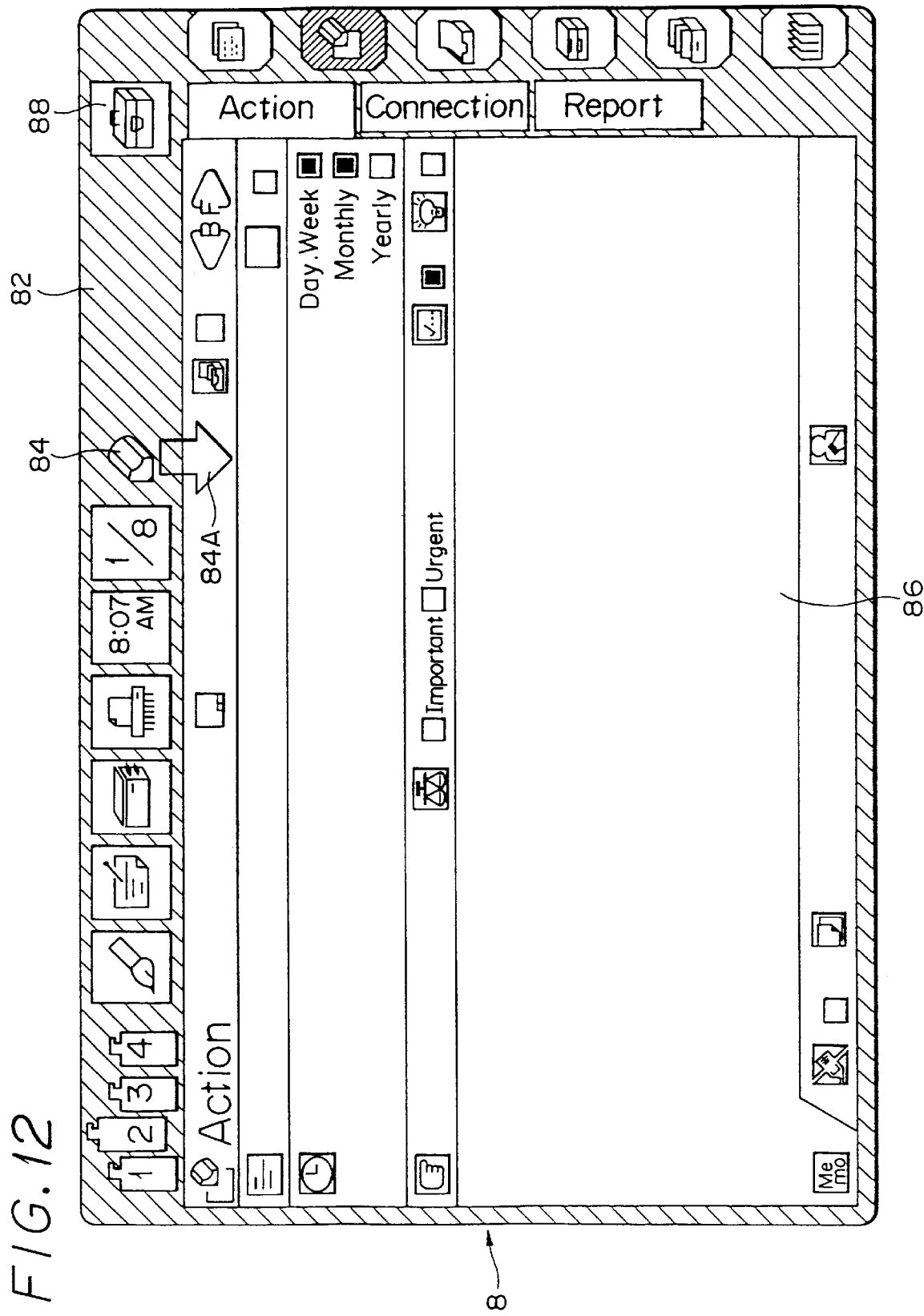
FIG. 12 is a schematic diagram showing a displayed content on the display screen when a "printing type" icon is touched with a pen.

Referring to FIG. 10, following the Start of operation, it is determined in the next decision step S0 by the CPU 41 whether or not the icon 84 is placed within the icon area 82. If the icon 84 is placed within the icon area 82 as represented by a YES at decision step S0, then the processing proceeds to the next decision step S1. In decision step S1, it is determined by the CPU 41 whether or not the icon 84 is in the pen-down state and is being dragged from the icon area 82. If the icon 84 is not being dragged from the icon area 84 as represented by a NO at decision step S1, then the processing proceeds to step S2, whereat other processing is carried out. If the icon 84 is being dragged from the icon area 82 as represented by a YES at decision step S1, then the processing proceeds to step S3, whereat coordinate data of the penpoint is checked by the CPU 41. Then, the CPU 41 adds an open arrow 84A to the icon 84 which is placed in the pen-down state ("printing type" icon in the example of FIG. 12) so that the user must drag the pen down to a lower input display area (data writing area) 86 while the pen remains in the pen-down state.

It is determined in the next decision step S4 by the CPU 41 whether or not the penpoint of the pen is placed outside the icon area 82. If the penpoint is not placed outside of the icon area 82 as represented by a NO at decision step S4, then the processing proceeds to the next decision step S5. It is determined in decision step S5 whether or not the icon 84 is displayed in an enlarged scale as a window 84L. If the icon 84 is not displayed as the window 84L in the enlarged scale as represented by a NO at decision step S5, then the processing of the CPU 41 returns to step S1. If the icon 84 is displayed as the window 84L in the enlarged scale as represented by a YES at decision step S5, then the processing of the CPU 41 proceeds to the next step S6, whereat the enlarged display of the icon 84 is stopped and then the enlarged icon is returned to the icon-displayed state. This processing is the same as the processing in which the icon 84 is temporarily dragged from the icon area 82 and then returned again to the icon area 82.

If it is determined in decision step S4 by the CPU 41 that the penpoint is placed outside the icon area 82, then the processing of the CPU 41 proceeds to the next decision step S7. It is determined in decision step S7 by the CPU 41 whether or not the icon 84 is displayed in the enlarged scale (i.e., displayed as the window 84L). If the icon 84 is not displayed in the enlarged scale as represented by a NO at decision step S7, then the processing of the CPU 41 proceeds to the next step S8, whereat the icon 84 is enlarged and displayed as the window 84L (see FIG. 13) and then the icon state of the window is stopped. Having detected in decision step S7 that the icon 84 is displayed in the enlarged scale or having finished the step S8, the processing of the CPU 41 proceeds to step S9, whereat the window 84L is moved so that the coordinate of the present penpoint is placed at the position of half of the horizontal direction distance, i.e. width Wn of the icon displayed in the enlarged scale, i.e., the window 84L. See FIG. 14 This means that the center of the window 84L (point 84C which will be described later with reference to FIG. 13) becomes an action point H about which the entirety of the window 84L is moved in accordance with the movement of the pen. In that case, if the position of the icon displayed in the enlarged scale, i.e., the window 84L is not changed yet, then the drawing of the picture will be omitted.

Figure 13:
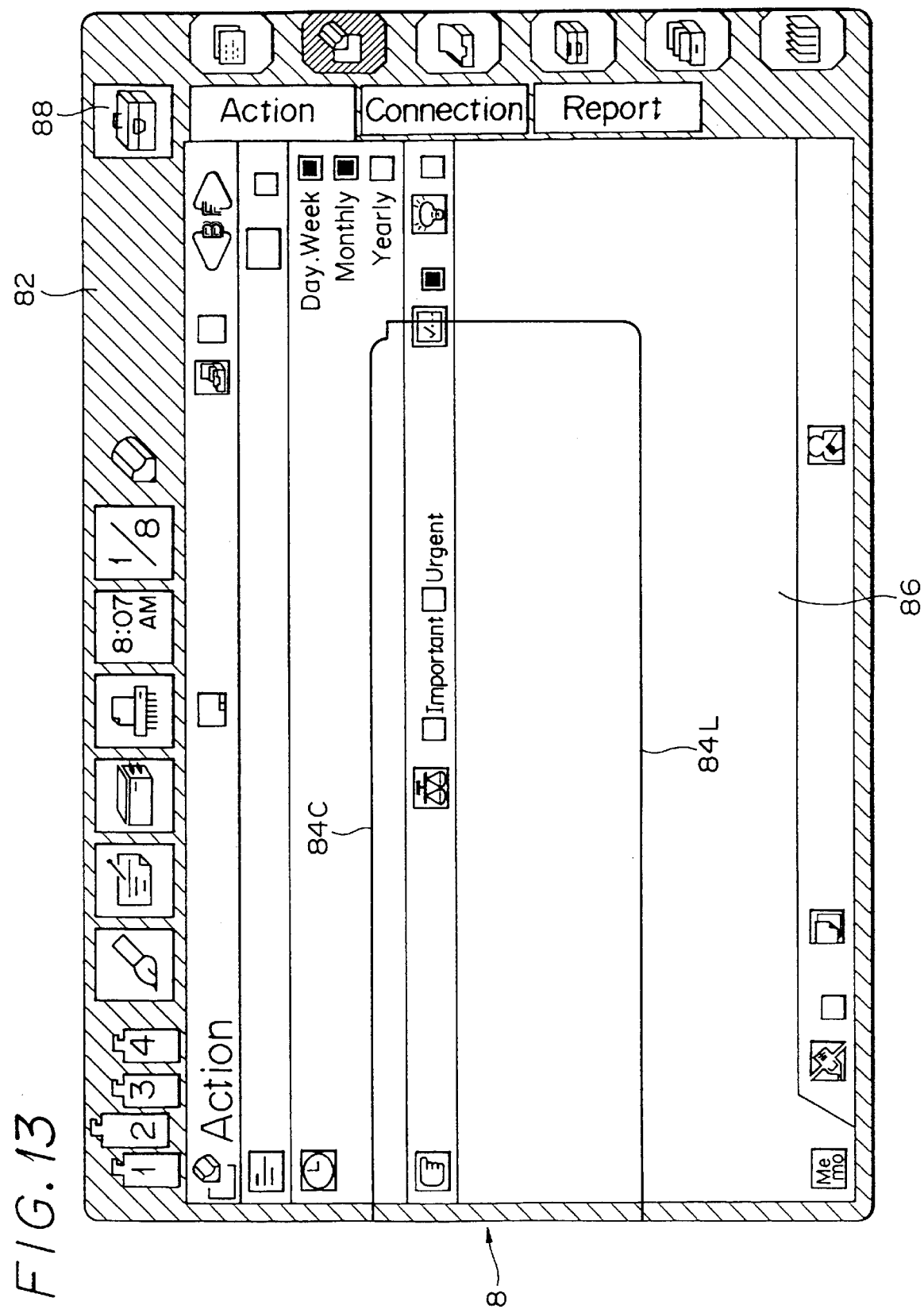
FIG. 13 is a schematic diagram showing a displayed content on the display screen when the "printing type" icon is dragged from the icon area to the input display area and displayed thereon in an enlarged scale.

FIG. 13 shows that the "printing type" icon 84 is dragged from the icon area 82 to the input display area 86 under the pen-down state and then displayed as a window 84L of "printing type plate" in an enlarged scale. At that time, the CPU 41 displays only the contour of the window 84L. The reason for this is that, if the window 84L is moved while an image on the inside of the window 84L is still displayed, then plenty of time is required for the data processing, which makes it impossible to move the window 84L at high speed. Also, the CPU 41 displays the window 84L under the condition that the central point 84C on the upper side of the window 84L of the "printing type plate" is made as the pen-down position.

Referring back to FIG. 10B, following the processing of step S9, it is determined in decision step S10 by the CPU 41 whether or not the pen 6 is in the pen-up state. If the pen 6 is not in the pen-up state as represented by a NO at decision step S10, then the processing of the CPU 41 returns to step S3. If on the other hand the pen 6 is in the pen-up state as represented by a YES at decision step S10, then the processing of the CPU 41 proceeds to step S14 (see FIG. 10B), whereat pen coordinates (g, d) of the pen-up position are stored in the working RAM 52.

Figure 14:
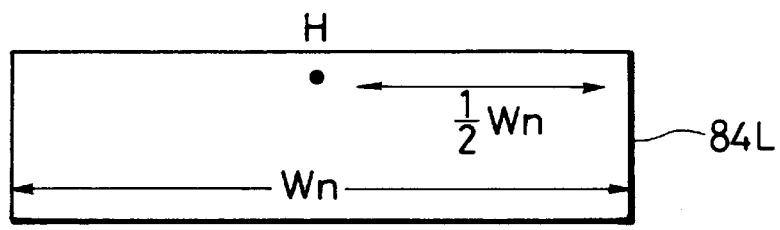
FIG. 14 is a schematic diagram used to explain the arrangement of the window.
Figure 15:
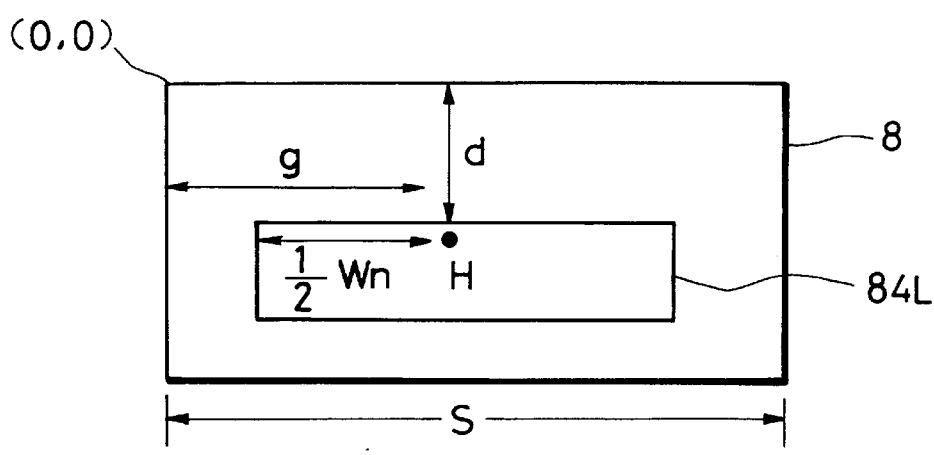
FIG. 15 is a schematic diagram used to explain a relation between the window and the display screen from a position standpoint.

Then, Wn assumes a width of the icon displayed in the enlarged scale, i.e., the window 84L as shown in FIG. 14, and S assumes a width of the display screen 8 as shown in FIG. 15. As earlier noted, the action point H of the window 84L is equal to the central point 84C of the upper side of the window 84L so that the action point H is located at the position of (½)Wn from the left end of the window 84L. Further, the pen coordinates (g, d) of the pen-up position of the pen 6 are coordinates of the central point 84C of the window 84L. Also, the coordinate origin (0, 0) is located at the upper left end of the display screen 8 so that, as shown in FIG. 15, a horizontal distance from the left end of the display screen 8 to the action point H (central point 84C) of the window 84L becomes g and that a vertical distance from the upper end of the display screen 8 to the action point H of the window 84L becomes d.

Then, as shown in FIG. 10B, it is determined in decision step S15 by the CPU 41 whether or not the following inequality (1) is established:

$$g<(½)Wn-\beta \tag{1}$$

Figure 20A:
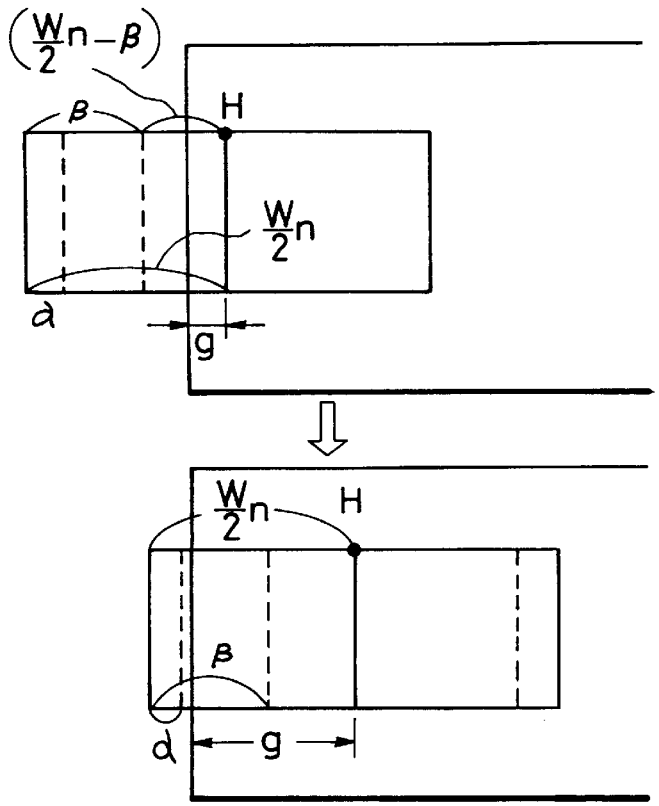
FIGS. 20A and 20B are schematic diagrams used to explain a meaning of β.

If the above-mentioned inequality (1), shown in the top half of FIG. 20A, is established as represented by a YES at decision step S15, then the processing proceeds to step S16, whereat the CPU 41 displays the window 84L in such a fashion that the action point H is located at the coordinates ((½)Wn-α, d), as shown in the lower half of FIG. 20A. Then, the CPU 41 displays a necessary content (image) in the inside of the contour of the window 84L in the next step S20. the terms α and β, as will be explained further, are predetermined values which are chosen so that enough of the window 84L will be within the screen 8 that the image contained in window 84L can be displayed substantially in whole.

Figure 16:
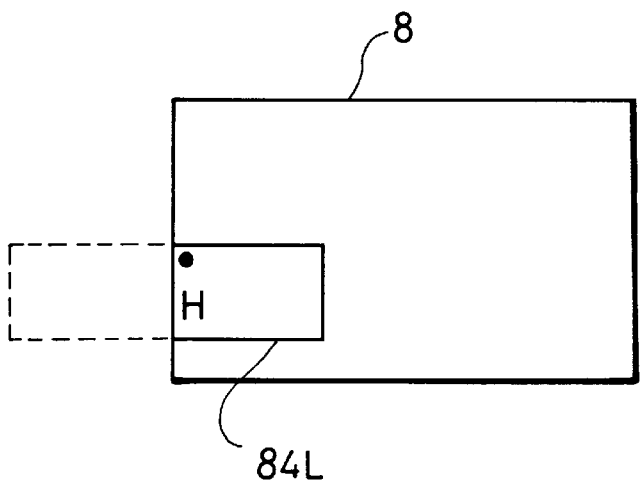
FIG. 16 is a schematic diagram showing the state such that the window is protruded from the display screen in the left direction.
Figure 17:
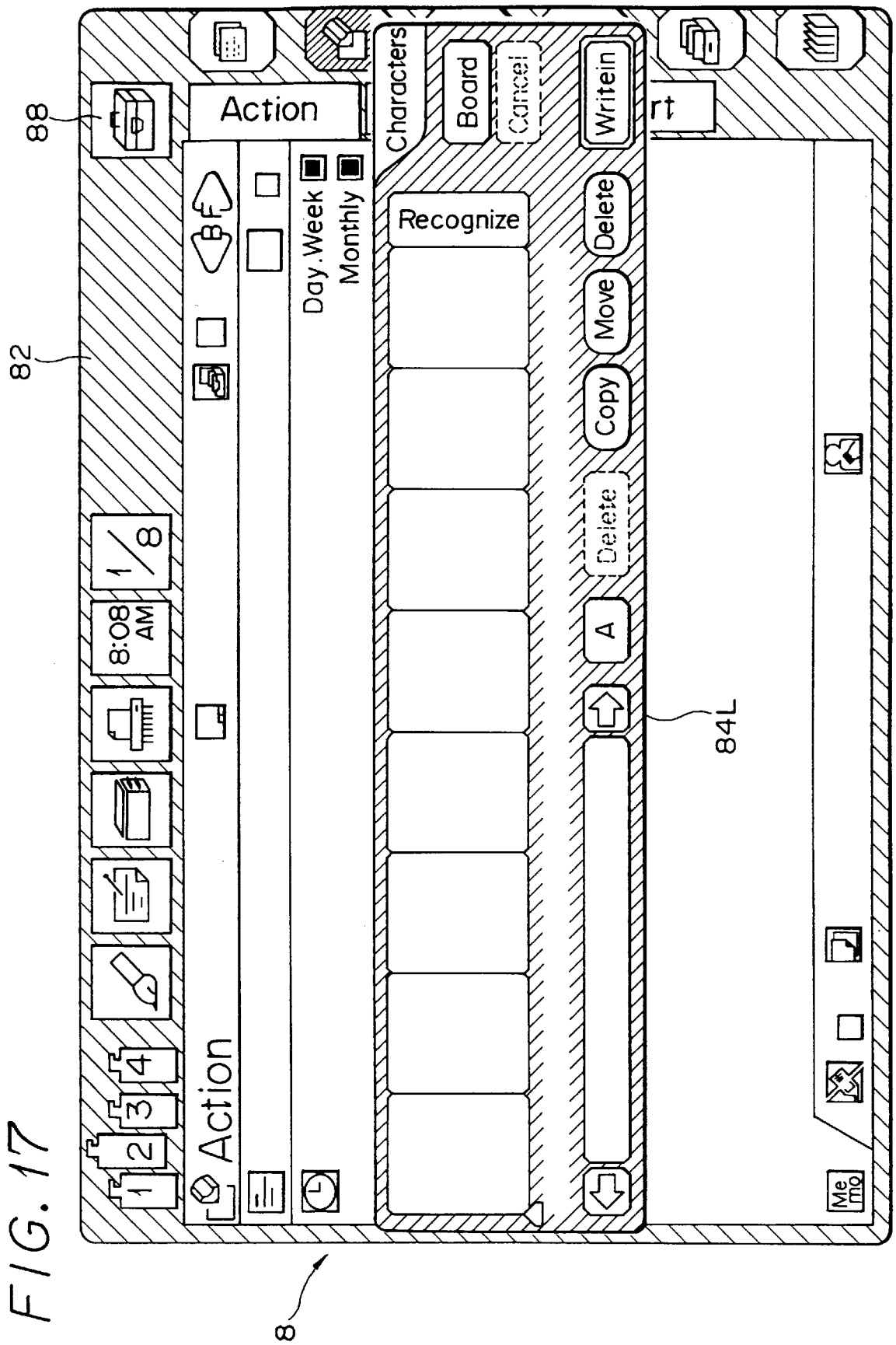
FIG. 17 is a schematic diagram showing a displayed content on the display screen when the window display position of the "printing type plate" is corrected.

A typical example in which the above inequality (1) is established is that the window 84L is projected to the left of the display screen 8 as shown in FIGS. 13 and 16. In that event, the processing in step S16 is executed and therefore the window 84L is displayed in such a manner that at least an effective display area of the window 84L is fully displayed within the display area 8 as shown in FIG. 17. Further, the processing of the above-mentioned step S20 is executed, whereby necessary images are displayed in the inside of the contour of the window 84L of the "printing type plate" as shown in FIG. 17.

If the above-mentioned inequality (1) is not established as represented by a NO at decision step S15, then the processing proceeds to the next decision step S17, whereat it is determined by the CPU 41 whether or not the following inequality (2) is established as:

$$g>S-(½) Wn+\beta \tag{2}$$

If the above-mentioned inequality (2) is established as represented by a YES at decision step S17, then the processing proceeds to step S18, whereat the CPU 41 displays the window 84L in such a fashion that the action point H is located at the coordinates (S-(½)Wm+α, d). Then, the processing of the CPU 41 proceeds to the next step S20, whereat the necessary content (image) is displayed in the inside of the contour of the window 84L.

Figure 18:
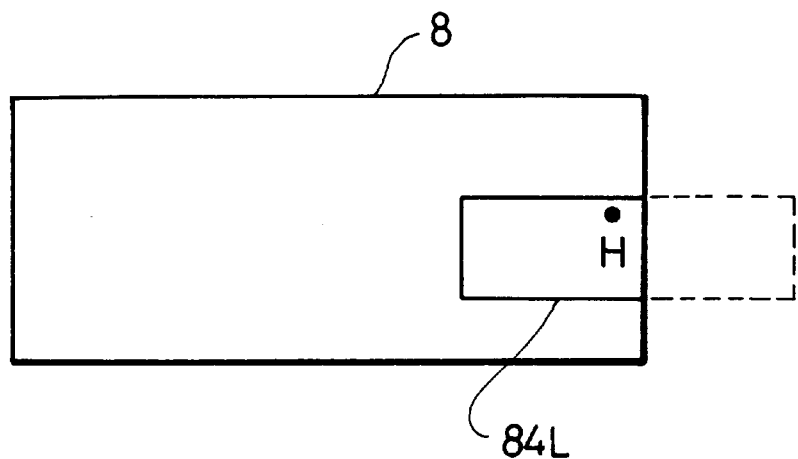
FIG. 18 is a schematic diagram showing the condition such that the window is protruded from the display screen in the right direction.

A typical example in which the inequality (2) is established is the case such that the window 84L is projected to the right of the display screen 8 as shown in FIG. 18. In that case, the processing of step S18 is executed and therefore the window 84L is displayed such that at least the effective display area of the window 84L is fully displayed within the display screen 8.

Thus, even if the inexperienced user drags the icon from the icon area 82 to the left or right position distant from the expected position too much when the user utilizes this portable computer for the first time, then the printing type plate is displayed at substantially the center of the display screen 8 correctly. There is then no risk that the user will misunderstand the user's own failure of operation as a trouble.

If neither the inequality (1) or (2) is established (i.e., if the effective display area is not projected from the display screen 8), then the processing of the CPU 41 proceeds to step S19, whereat the window 84L is displayed such that the action point H is located at the coordinates (g, d) (i.e., coordinates of the pen-up state). That is, the CPU 41 does not correct the display position of the window 84L in that event.

If it is determined in decision step S0 of FIG. 10 by the CPU 41 that the icon is located outside of the icon area 82, then the processing proceeds to the next decision step S31 of FIG. 10A, whereat it is determined whether or not the window is displayed on the display screen 8 (input display area 86). If the window is not displayed on the display screen 8 as represented by a NO at decision step S31, then the processing proceeds to step S32, whereat other processing is executed. If on the other hand the window is displayed on the display screen 8 as represented by a YES at decision step S31, then the processing proceeds to the next decision step S33, whereat it is determined by the CPU 41 whether or not the pen 6 is placed in the pen-down state. If the pen 6 is not in the pen-down state as represented by a NO at decision step S33, then the processing returns to step S31. If the pen 6 is in the pen-down state as represented by a YES at decisions step S33, then the processing proceeds to step S34, whereat the coordinates of the penpoint are checked. If it is determined at the next decision step S35 by the CPU 41 that the penpoint coordinates are located outside of the window (i.e., a No is output), then the processing proceeds to step S36, whereat other processing is executed.

Figure 21:
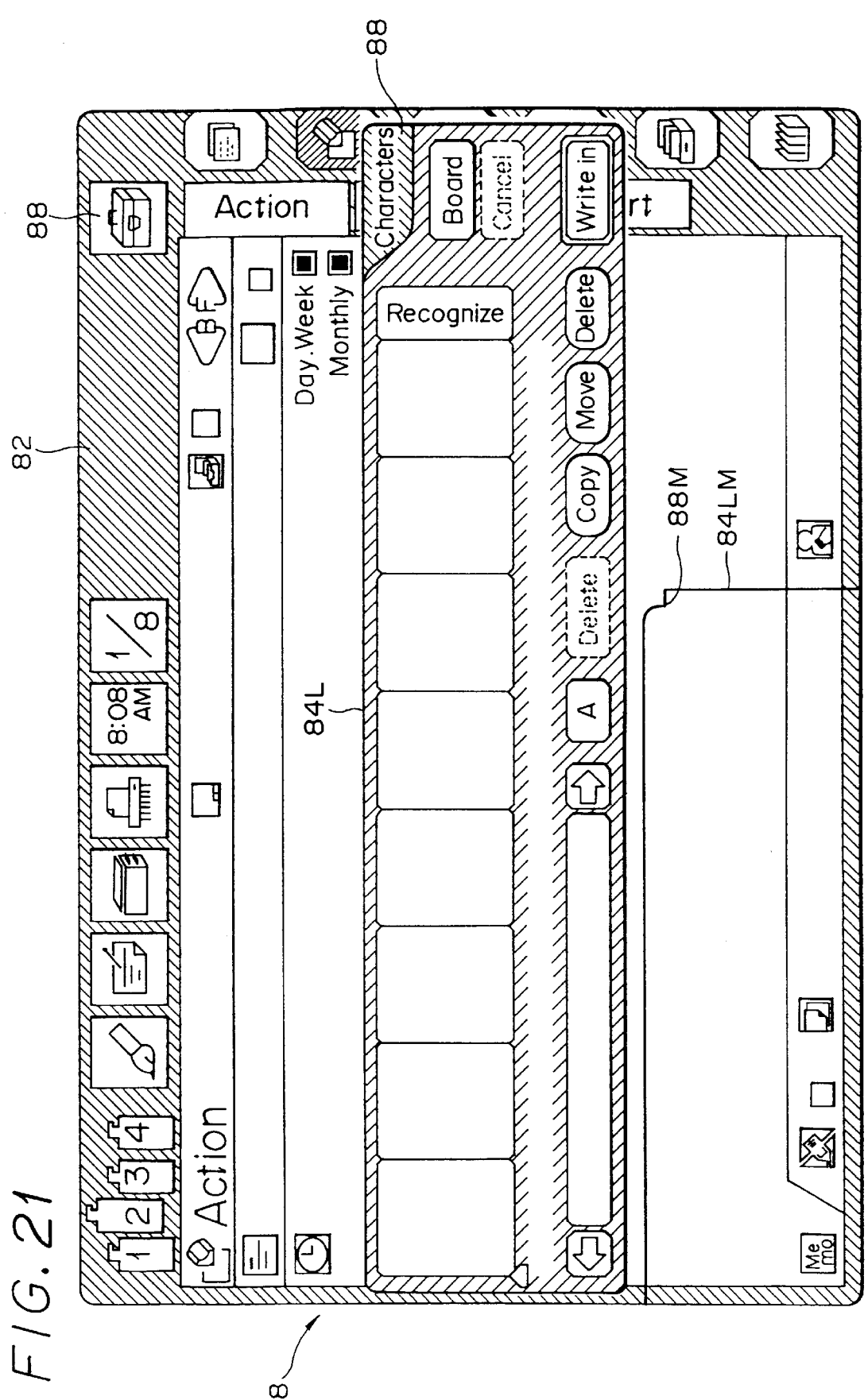
FIG. 21 is a schematic diagram showing a displayed content on the display screen when the pen is pressed on the area in which "printing type" character of the "printing type plate" window is displayed and the pen is dragged to the lower left side in the pen-down state.

If the pen-down position lies in a predetermined position within the window (i.e., on the dark contour line of the outer periphery of the display screen or an upper right corner portion 88 in which characters of printing types in FIG. 21) as represented by a YES at decision step S35, then the processing proceeds to the next decision step S37, whereat it is determined whether or not the pen 6 is in its pen-up position. If the pen 6 is not placed in the pen-up state, then the processing proceeds to step S38, whereat the penpoint coordinates are examined. If the penpoint coordinates are located outside of the icon area 82 as represented by a NO at the next decision step S39, then the processing proceeds to step S40, wherein the window is displayed at the position corresponding to the position of the present penpoint coordinates on the window. If the position of the penpoint coordinates is not moved, then the drawing of picture may be omitted. Then, the processing returns from step S40 to step S37. That is, by the loop from steps S37 to S40, the window (its contour) is freely moved in response to the moved position of the pen 6.

If the penpoint is entered into the inside of the icon area 82 as represented by a YES at decision step S39, then the processing proceeds to step S41, whereat the display of the window is stopped and then the icon is displayed. That is, the penpoint is entered the icon area 82 and therefore the window is accommodated within the icon area 82. Then, the processing returns from step S41 to step S37.

If the pen 6 is placed in the pen-up state as represented by a YES at decision step S37, then the processing proceeds to step S42, whereat the icon or window is displayed, and then the processing of the CPU 41 returns to step S0.

As described above, although the displayed position of the window is corrected to be the position near the center immediately after the icon is dragged from the icon area 82, then the position is not corrected after the icon was dragged from the icon area 82 once and moved and displayed at the position designated by the pen 6.

Figure 19:
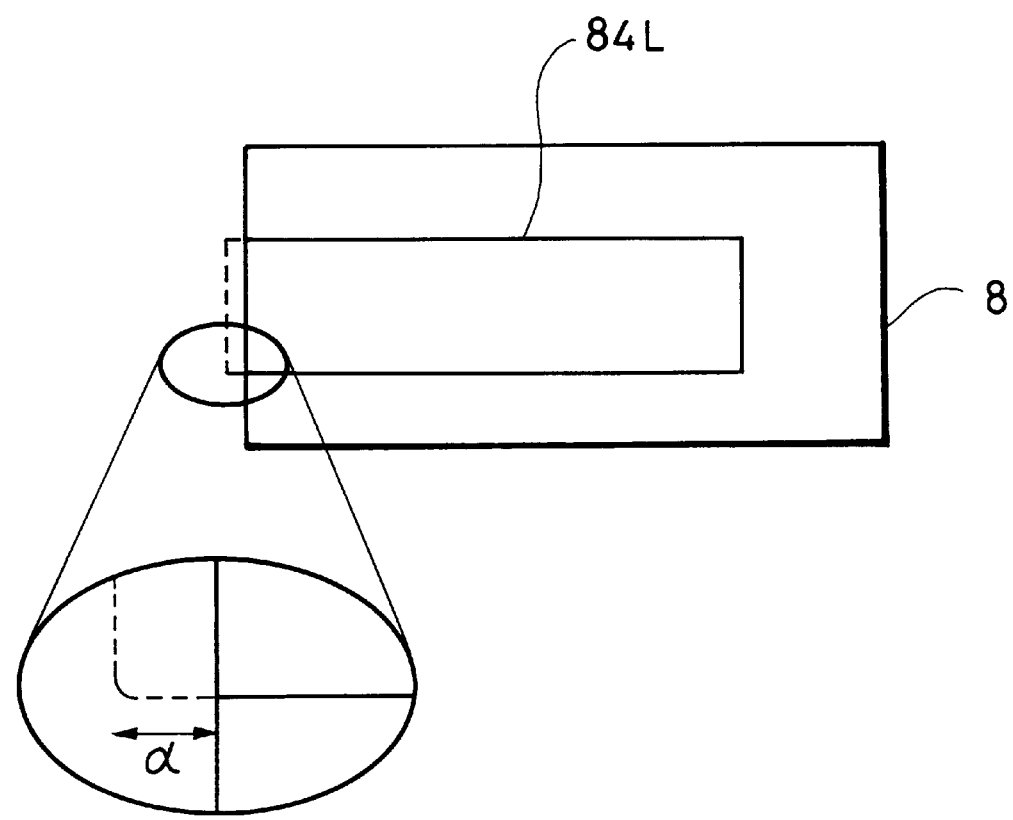
FIG. 19 is a schematic diagram used to explain a meaning of α.

If the above $\alpha$ is selected to be a proper value, then the effective display area of the window 84L can be fully displayed within the display screen 8 although a portion of the window 84L is projected from the display screen 8, as shown in FIG. 19. If $\alpha$ is set to be zero, then the window 84L can be wholly displayed within the display screen 8, while if $\alpha$ is selected to be a negative value, then the window 84L can be displayed nearer to the central portion of the display screen 8.

The above $\beta$ is an offset value indicative of a threshold value used when the displayed position of the window is corrected. If the offset value $\beta$ is set to be proper value, as shown in FIG. 20A, when the displayed position of the window 84L designated by the user is projected more than $\beta$ immediately after the icon is dragged from the icon area 82, then the displayed position of the window 84L is corrected in such a fashion that the window 84L may not be projected from the display screen 8, more precisely, the window 84L may be projected from the display screen 8 only by $\alpha$. In that event, p functions as an offset value indicative of a tolerance in which the window 84L is allowed to project from the display screen 8. If $\beta$ is set to be zero, then when the left or right end of the window 84 or window displayed position designated by the user exceeds the left or right end of the display screen 8, the display position of the window is corrected. Further, if $\alpha$ and $\beta$ are set to be equal to each other, when the window displayed position exceeds the effective display area, the window displayed position is corrected.

Figure 20B:
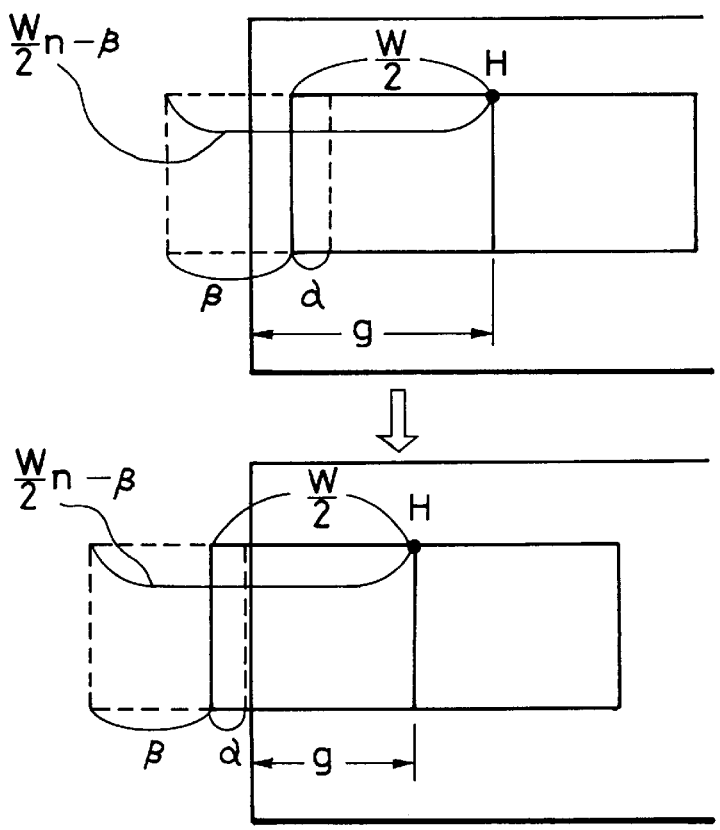

If $\beta$ is set to be a proper negative value, as shown in FIG. 20B, although the displacement of the window displayed position designated by the user is very small and the window displayed position is not projected from the display screen 8, the window 84L is displayed on the display screen 8 in such a manner that only the effective display area of the window 84L remains on the display screen 8.

Figure 22:
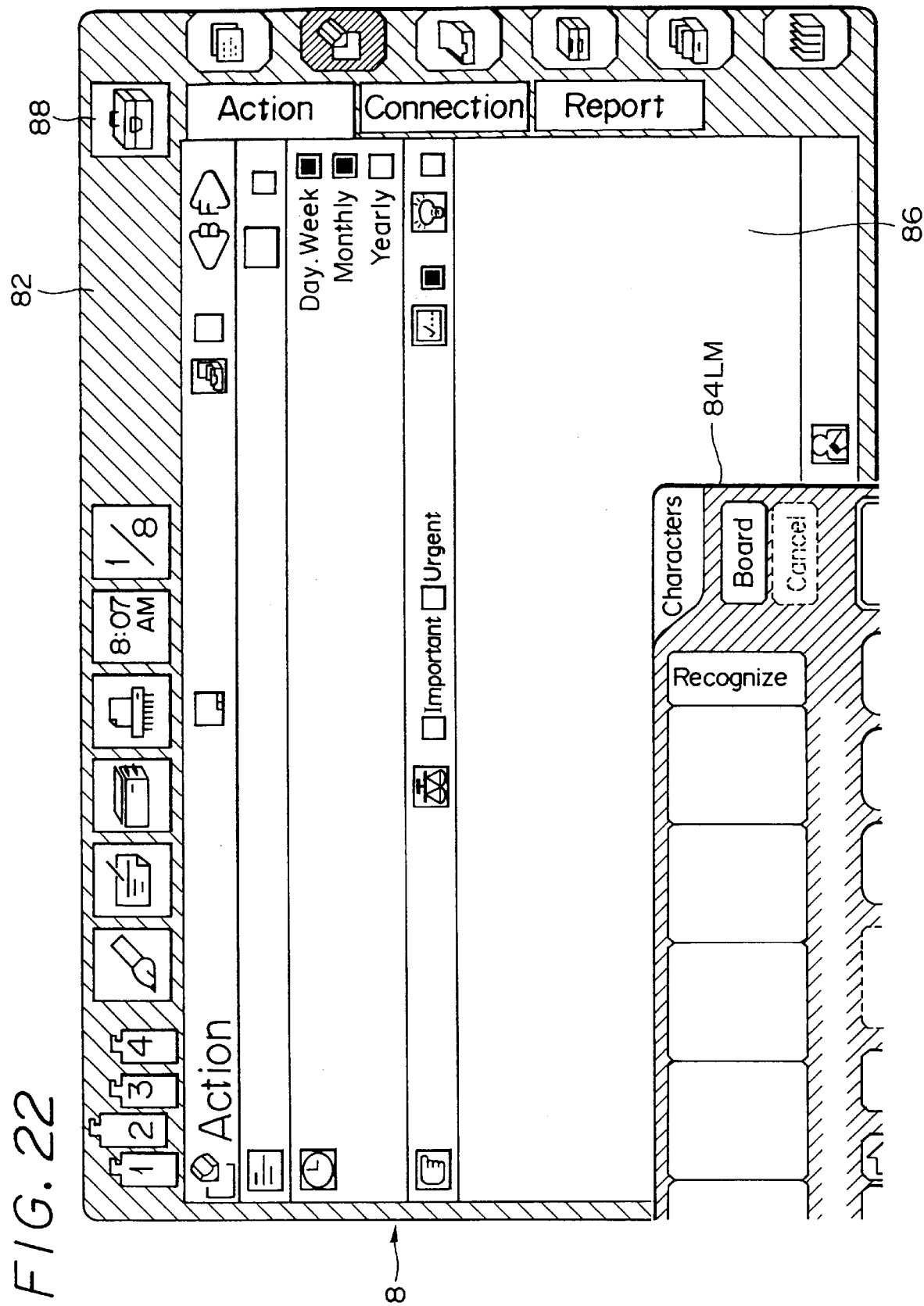
FIG. 22 is a schematic diagram showing a displayed content on the display screen when the "printing type plate" window is protruded from the display screen upon display.

If on the other hand the icon is not dragged from the icon area 82 for the first time but the dragged icon is moved to a predetermined position, $\beta$ (including $\alpha$) may be neglected. As, for example, shown in FIG. 21, if the user touches an area 88 on which the characters "printing type" of the "printing type plate" window 84L are already displayed with the pen 6, drags the pen 6 to the lower left in the pen-down state (reference numeral 88M in FIG. 21 represents the pen movement position), lifts up the pen 6 at that position and then the window displayed position is designated at the position shown by a contour line 84LM, it is determined that such operation is made in order to intentionally project the "printing type plate" window 84L from the display screen 8 (e.g., in order to widen the input display screen). As a consequence, the "printing type plate" window is displayed at the position of the contour line 84LM designated by the pen-up position as shown in FIG. 22.

Figure 23:
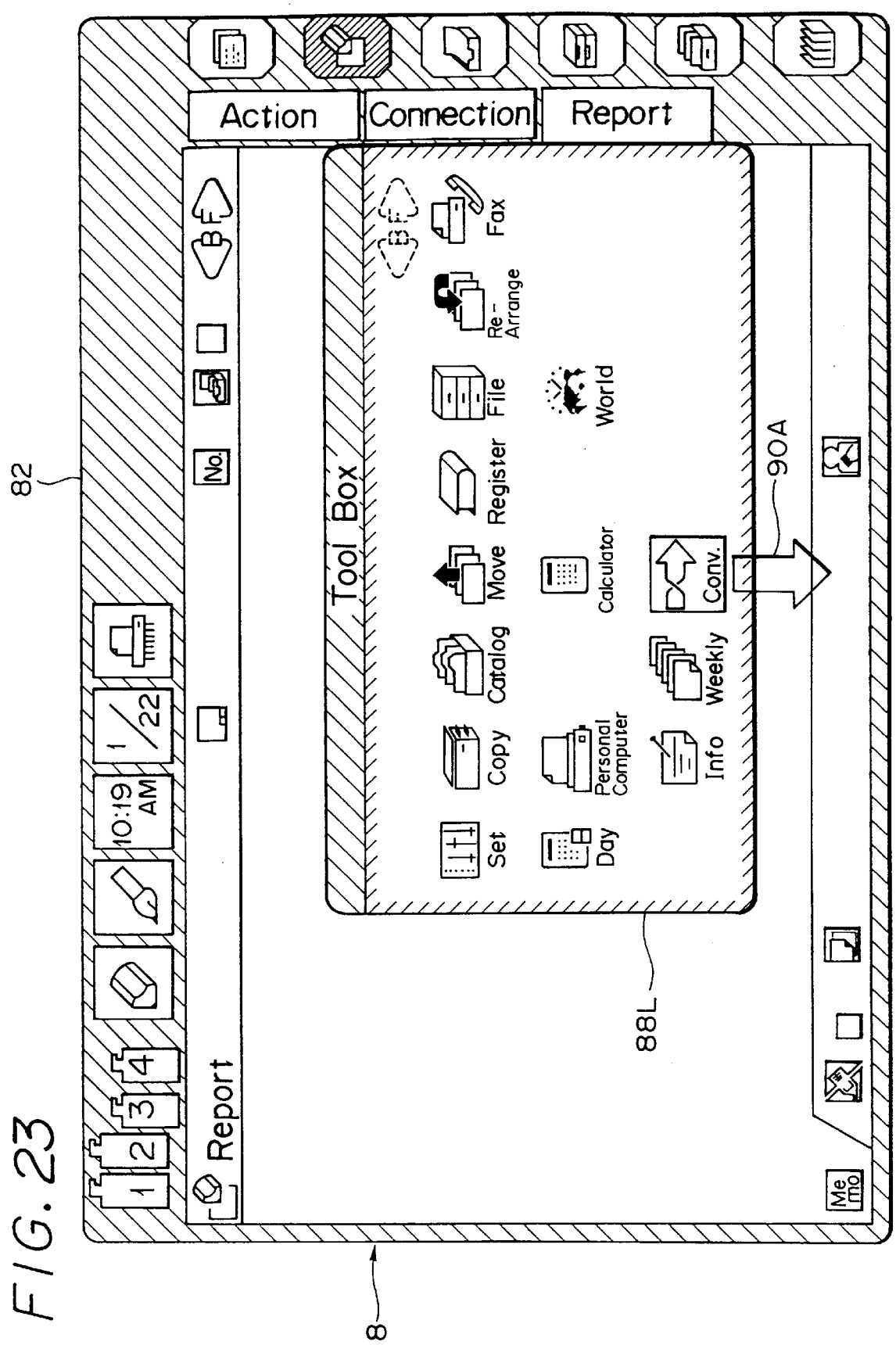
FIG. 23 is a schematic diagram showing a displayed content on the display screen when a "tool" icon is dragged from the icon area and displayed on the display screen in an enlarged scale.

While the icon is dragged from the icon area and displayed as the window in an enlarged scale as described above, the present invention is not limited thereto and may be applied to a variety of window displays. For example, if "tool" icon 88 shown in FIGS. 11, 12, 13, 17, 19 and 22 is dragged from the icon area, as shown in FIG. 23, the "tool" icon 88 is enlarged and displayed as a window 88L. Since various icons are displayed within this window 88L, this window area becomes a kind of icon area. Accordingly, if the user touches, for example, "conversion" icon 90 within this window 88L with the pen 6, an open arrow 90A is displayed. Then, the displayed position of the window (not shown) for the "conversion" processing dragged from the window 88L and then enlarged can be corrected by the processings shown in FIGS. 10A and 10B.

While only the contour of the window is displayed when the window is moved as described above, the present invention is not limited thereto and necessary image within the contour may be displayed simultaneously.

While the pen is utilized as the means for pointing the position of the window as described above, the present invention is not limited thereto and other coordinate input devices such as a mouse or the like may be utilized.

Further, while the window displayed position is corrected in the left and right direction as described above, the present invention is not limited thereto and the window displayed position may be corrected in the upper and lower direction.

Furthermore, while the CPU and the program constitute the window displayed position correcting means as described above, the present invention is not limited thereto and the window displayed position correcting means may be formed of an exclusive-hardware.

According to the window display apparatus of the first aspect of the present invention, since the window displayed position is corrected in such a manner that at least the effective display area of the window is wholly displayed within the display screen, the effective display area of the window can be prevented from being projected from the display screen upon display.

According to the window display apparatus of the second aspect of the present invention, since the display position is corrected or not corrected on the basis of the condition when the display position designated lies outside of the tolerance range, the user can operate the window display apparatus in accordance with the user's own intention and the window display apparatus can be operated more conveniently, thus making it possible to operate the window display apparatus more naturally in accordance with user's feeling in operation.

Having described the preferred embodiment of the invention with reference to the accompanying drawings, it is to be understood that the invention is not limited to that precise embodiment and that various changes and modifications thereof could be effected by one skilled in the art without departing from the spirit or scope of the invention as defined in the appended claims.

What is claimed is:

1. A display apparatus for displaying a window image thereon, the window image having an image area, the display apparatus comprising:

(a) a display for displaying the window image at a selected position of the display, the display having a visible area;

(b) a coordinate data input device for choosing the selected position by pointing to a window display area so as to display the window image on the display;

(c) a memory for storing the window image;

(d) a controller for supplying the window image from said memory to said display; and (e) correction means for automatically correcting the selected position of a window image which protrudes from the visible area, wherein said correction means corrects the position of the window image so that the window image is displayed wholly within the visible area.

2. A display apparatus according to claim 1, wherein said window image is generated from an icon when pointed to by the coordinate data input device.

3. A display apparatus according to claim 2, wherein the coordinate data input device includes a pen for pointing to a coordinate position and a tablet pointed to by said pen for detecting coordinate data.

4. A display apparatus according to claim 3, wherein the window image is generated at the selected position when a user touches a portion of the display corresponding to the icon with the pen and drags the pen on the tablet to the selected position and lifts the pen up from the tablet.

5. A display apparatus for displaying a window image comprising:

(a) a display for displaying the window image;

(b) a coordinate data input device for pointing to a window display area so as to display the window image on the display;

(c) a memory for storing the window image;

(d) a controller for supplying the window image from the memory to the display;

(e) correction means for automatically correcting a display position of a window image which protrudes from a visible area of the display; and (f) detecting means for detecting the protrusion of the window image, wherein in response to such detection the correction means corrects the position of the window image so that the window image is displayed wholly within the visible area.

6. A display apparatus according to claim 5, wherein the window image is generated from an icon when pointed to by the coordinate data input device.

7. A display apparatus according to claim 6, wherein the coordinate data input device includes a pen for pointing to a coordinate position and a tablet pointed to by the pen for detecting coordinate data.

8. A display apparatus according to claim 7, wherein the window image is generated at the display position when a user touches a portion of the display corresponding to the icon with the pen and drags the pen on the tablet to a desired position and lifts up the pen.

9. A display apparatus according to claim 8, wherein the detecting means detects the protrusion when the pen drags the icon from an icon area to an operating area on the tablet, thereby forming the protrusion.

* * * * *

UNITED STATES PATENT AND TRADEMARK OFFICE
CERTIFICATE OF CORRECTION

PATENT NO.: 5,903,268
DATED: May 11, 1999
INVENTOR(S): TOMOSHI HIRAYAMA

It is certified that an error appears in the above-identified patent and that said Letters Patent is hereby corrected as shown below:

On the title page, item [54] and Column 1:

WINDOW POSITION CONTROL APPARATUS FOR DISPLAYING A WINDOW'S EFFECTIVE IMAGE.

Signed and Sealed this

Twenty-third Day of May, 2000

Attest:

Q. TODD DICKINSON

*Attesting Officer*  *Director of Patents and Trademarks*